Patented Nov. 7, 1933

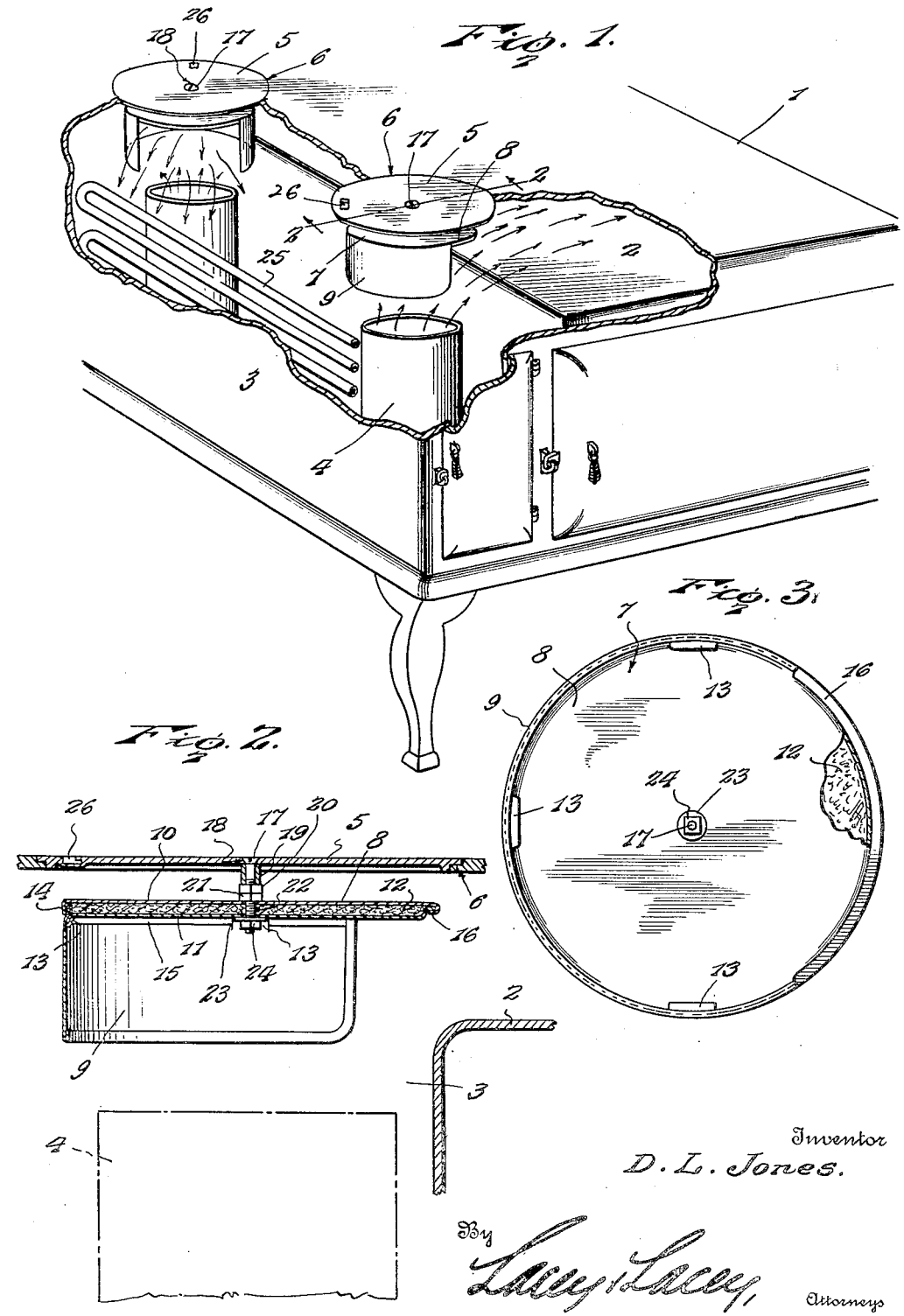

1,934,127

UNITED STATES PATENT OFFICE 1,934,127

HEAT DEFLECTOR

Daniel L. Jones, Norridgewock, Maine

Application March 12, 1931. Serial No. 522,030

6 Claims. (Cl. 126—214)

This invention relates to a heat deflector and one object of the invention is to provide a deflector which may be applied to a stove lid above a burner and cause heat rising from the burner to be directed over an oven of the stove or in any other direction desired. When a stove having a fire box next to its oven is equipped with a burner set in the fire box, the heat from the burner often has a tendency to concentrate in the fire box instead of immediately passing from the fire box over the oven to the draft pipe of a stove. It also often happens that the heat will be expended by heating the walls of the fire box and lid over the burner before passing above the oven, and consequently the oven will not be properly heated.

Therefore another object of the invention is to so construct the improved heat deflector that it may be suspended from a stove lid in the top of the fire box above a burner and serve to prevent the hot gases rising from the burner from having direct contact with the lid and further to so construct the deflector that when the hot gases strike the deflector they will be directed over the oven and thereby cause the oven to be quickly heated and maintained at a high temperature.

Another object of the invention is to so construct and mount the deflector that when it is in place it may be adjusted in order to cause the hot gases rising from the burners to be directed either across the oven or longitudinally of the fire box and thereby permit any portion of a stove top to be very effectively heated.

Another object of the invention is to provide a device of this character which is very simple in construction and may be easily applied to a stove lid.

The invention is illustrated in the accompanying drawing, wherein:

Figure 1 is a perspective view showing the improved deflector applied to the lid of a stove above a burner in the fire box of the stove.

Figure 2 is a sectional view taken along the line 2—2 of Figure 1, and

Figure 3 is a bottom plan view of the heat deflector.

The stove which is indicated in general by the numeral 1 is of a conventional construction and has an oven 2 located next to the fire box 3 so that the heat from the fire box may pass through the space between the oven and the top of the stove to the usual outlet and cause the oven to be heated. This is a conventional construction in coal stoves and in the present instance the grates have been removed or omitted from the fire box and a gas or oil burner 4 mounted in the fire box beneath each of the lids 5 by means of which openings 6 formed in the top of the stove above the fire box are closed.

In view of the fact that the burners do not occupy the entire space within the fire box, it has been found that hot gases rising from the burners have a tendency to spread in all directions and a great deal of heat is lost by these hot gases filling the fire box and heating the walls and top thereof before passing over the oven and consequently the oven is not quickly heated and maintained at a high temperature. This objection is overcome by disposing beneath each lid 5 a heat deflector 7 which is suspended from the lid as shown clearly in Figure 2 and disposed directly over a burner beneath the lid.

Referring to Figure 2 it will be seen that the deflector has a top 8 which is circular in shape as shown in Figure 3 and depending walls 9 extending downwardly from the top about its margins for the major portion of the circumference of the top, but having their ends spaced from each other in order to provide a passage through which the hot gases pass after striking the top of the deflector. This is clearly shown in Figures 1 and 2 where the arrows indicate the manner in which the hot gases are deflected into the space between the oven and top of the stove by the deflector.

The heat deflector has its top 8 in the form of a shell having upper and lower walls 10 and 11 and in the space between these walls is located a packing 12 formed of asbestos. The two walls 10 and 11 are preferably formed of sheet metal although any other desired material may be used and the depending wall is also formed of sheet metal. The upper edge portion of the wall 9 is cut to form tongues 13 spaced from each other circumferentially of the top and these tongues are bent to project inwardly from the marginal wall and bear against the underface of the bottom wall 11 of the top as clearly shown in Figures 2 and 3.

The portions of the marginal wall between these tongues and between the tongues and the end of the wall extend into the space between the upper and lower walls of the top and a crimped joint is formed as shown at 14 to firmly secure the edge portions of the walls 9 and 10 together with the marginal portion of the wall 11 bearing against the inner surface of the wall 9 and bent downwardly a slight extent as shown at 15 in order to have good contacting engagement with the wall 9. Between the ends of the marginal wall, the marginal portions of the walls 10 and 11 are formed into a lapped joint as shown at 16. It will thus be seen that the wall 9 will be firmly secured along its upper margin to the top or head 8 of the deflector and since the top is provided with an asbestos lining, the lid from which the deflector is suspended will be very well shielded from the hot gases rising from the burner and these hot gases will be directed through the space or passage between ends of the marginal wall and caused to pass over the oven as indicated by the arrows in Figures 1 and 2 or in whatever direction the space between ends of the marginal wall is facing.

In order to suspend the deflector from a stove lid, there has been provided a bolt 17 which has its head countersunk in an opening 18 formed in the stove lid. This bolt carries a sleeve 19 which bears against the underface of the lid and is firmly held in place by a nut 20. A second nut 21 is screwed upon the bolt to engage the nut 20 and serve as a locking nut and the portion of the bolt beneath the nut 21 extends through an opening 22 formed centrally in the top of the deflector. After the bolt has been passed through the top of the deflector, a washer 23 is applied and then a nut 24, which when tightened will cause the deflector to be firmly held in place.

It should be noted, however, that the stove lid may be turned in order to cause the hot gases to be directed either across the top of the oven or in any direction desired. Therefore the gases may be directed longitudinally of the fire box, towards a water heating coil 25 or diagonally across the top of the oven if only one burner is lighted. Since it is merely necessary to drill an opening in the center of a stove lid in order to mount the deflector it may be very easily applied either to stoves already in use or as an attachment to new stoves. By locating the passage between ends of the annular wall 9 opposite the lifter receiving socket 26 of the lid the location of this passage can be determined without lifting the lid.

What is claimed is:

1. The combination with a stove including a burner and stove lid, of a heat deflector comprising a body having an imperforate heat insulating head and depending walls about margins of the head, said walls having ends spaced from each other to form a passage at one side of the body, and means to suspend the deflector from the stove lid above the burner whereby when the stove lid is turned in its seat the deflector will be correspondingly turned to deflect the heat from the burner in the desired direction.

2. The combination with a stove including a stove lid, of a heat deflector comprising a body having a substantially circular imperforate heat insulating head and a cylindrical wall extending downwardly from marginal portions of the head with its ends spaced from each other to form a passage at one side of the body, and means for rigidly securing the deflector to a stove lid whereby turning movement of the stove lid in its seat will impart a corresponding turning movement to the deflector.

3. The combination with a stove including a stove lid, of a heat deflector comprising a body having a substantially circular imperforate head and a wall extending downwardly from marginal portions of the head with its ends spaced from each other to form a passage at one side of the body, said head being in the form of a shell having top and bottom walls and a lining of heat insulating material in the shell between the walls thereof, and means for rigidly securing the deflector to and suspending said deflector from the lid of a stove whereby turning movement of the stove lid in its seat will impart a corresponding turning movement to the deflector.

4. A heat deflector comprising a body having a head and a wall extending downwardly from marginal portions of the head with its ends spaced from each other to form a passage at one side of the body, said head being in the form of a shell having top and bottom walls and a lining of heat insulating material in the shell between the walls thereof, the marginal wall having its upper portion engaged between edge portions of the upper and lower walls joined to edge portions of the upper wall, tongues being cut from the marginal wall and bearing against the under face of the lower wall to brace the lower wall against downward movement.

5. The combination with a stove including a stove lid, of a heat deflector comprising a body having an imperforate heat insulating head and a wall extending downwardly from marginal portions of the head with its ends spaced from each other to form a passage at one side of the body, and a bolt extending through an opening formed in the center of said head and projecting upwardly therefrom and rigidly attached to a stove lid whereby turning movement of the stove lid in its seat will impart a corresponding turning movement to the deflector thereby to permit the deflector to be turned for directional adjustment about its axis.

6. The combination with a stove including a stove lid, of a heat deflector comprising a body having a substantially circular imperforate heat insulating head and depending walls about margins of the head, said walls having ends spaced from each other to form a passage at one side of the body, and means to suspend the deflector from the stove lid for turning movement therewith consisting of a bolt engaged through an opening formed in the lid, a spacing sleeve upon said bolt, a nut upon said bolt holding the sleeve firmly against the underface of the stove lid, a second nut upon said bolt constituting a locking nut for the first nut, the lower portion of said bolt being engaged through an opening formed in the head of the deflector and a nut upon the bolt serving to secure the head upon the bolt and bind the head against the second mentioned nut.

DANIEL L. JONES. [L. S.]